United States Patent Office 3,397,269
Patented Aug. 13, 1968

3,397,269
METHOD FOR CONTROLLING PESTS SELECTED FROM INSECTS AND MITES WITH PHOSPHOROMONO- OR DITHIOATES AND THIOCARBONATES
Edward N. Walsh, New City, N.Y., assignor to Stauffer Chemical Company, New York, N.Y., a corporation of Delaware
No Drawing. Continuation-in-part of application Ser. No. 341,103, Jan. 29, 1964. This application May 16, 1967, Ser. No. 638,760
10 Claims. (Cl. 424—205)

ABSTRACT OF THE DISCLOSURE

Pests are controlled through the application of a pesticidal amount of a compound having the formula:

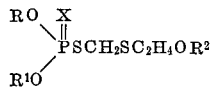

wherein R and $R^1$ are lower alkyl, X is a chalcogen such as oxygen or sulfur, and $R^2$ is selected from the group consisting of

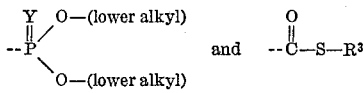

where Y is chalcogen such as oxygen or sulfur and $R^3$ is selected from the group consisting of lower alkyl and phenyl.

---

This application is a continuation-in-part application of copending application Ser. No. 341,103, filed Jan. 29, 1964, now U.S. Patent No. 3,354,195.

The present invention is directed to the use of a novel group of organophosphorus compounds as pesticides. The novel compounds may be represented by the following general formula:

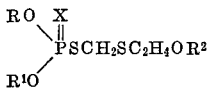

wherein R and $R^1$ are lower alkyl, X is a chalcogen such as oxygen or sulfur, and $R^2$ is selected from the group consisting of

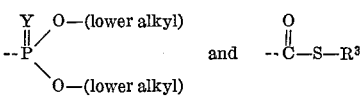

where Y is chalcogen such as oxygen or sulfur and $R^3$ is selected from the group consisting of lower alkyl and phenyl. Suitable lower alkyl radicals for R, $R^1$, and $R^3$ will include methyl, ethyl, propyl, isobutyl, amyl, octyl, and the like.

The process for preparing the said novel compounds used in the process of this invention may be illustrated by the following general equation:

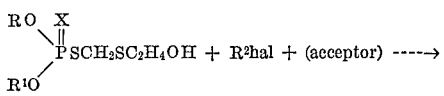

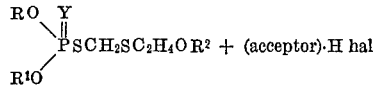

where R, $R^1$, $R^2$, and X are as defined above, "hal" denotes a halogen having a molecular weight greater than 30 such as chlorine, bromine, and iodine, preferably chlorine, and "acceptor" denotes a hydrogen halide acceptor such as triethylamine, trimethylamine, or the equivalent. The reactants, which are effectively used in substantially stoichiometric proportions, are all well known and readily available compounds. The reaction is preferably carried out in the presence of an inert organic solvent such as benzene, acetone, ether, etc., at about room temperature or only slightly above. Nevertheless, temperatures as low as 0° C. and as high as 100° C. may be used.

The preparation of the compounds utilized in this invention is illustrated by the following examples.

Example 1

To 27.6 grams of $(C_2H_5O)_2P(S)SCH_2SC_2H_4OH$ and 11.0 grams of triethylamine in 100 ml. of benzene was added 17.2 grams of $(C_2H_5O)_2P(O)Cl$ while stirring the reaction mixture at 27–29° C. for 2 minutes. Stirring was then continued for 17 hours at room temperature, after which the reaction mixture was heated to 50° C. for 30 additional minutes, cooled, filtered to remove triethylamine hydrochloride (9.9 grams) and concentrated by evaporation to 60° C. at 1 mm. Hg. The residue collected after evaporation consisted of 41.5 grams (essentially a quantitative yield) of O,O-diethyl-S-[2-(O,O-diethyl phosphoro) ethylthiomethyl]phosphorodithioate having an index of refraction $N_D{}^{25}=1.5000$ and an analysis of 14.7% P and 22.0% S compared to the theoretical values of 15.5% P and 23.2% S.

Example 2

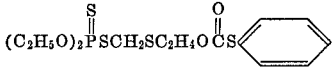

To 16.5 grams of $(C_2H_5O)_2P(S)SCH_2SC_2H_4OH$ and 10.3 grams $ClC(O)SC_6H_5$ in 100 ml. of ether was added 6.7 grams of triethylamine in 20 ml. of ether while stirring at 25° C. The reaction mixture was permitted to stir for an additional 2 hours at 25° C. after which it was refluxed 30 minutes and allowed to stir at room temperature overnight. The crude product was washed with 50 cc. of water and counter extracted with 50 cc. of ethyl ether. The ether solution was concentrated by evaporation to 60° C. at 1 mm. of Hg to yield 21.3 grams (84% theoretical yield) of O,O-diethyl-S-[2-(S-phenylthiocarbonato) ethylthiomethyl] phosphorodithioate having an index of refraction $N_D{}^{25}=1.5770$. The analysis of the concentrated product showed 7.3% P and 31.8% S compared ot the theoretical calculated values of 7.5% P and 31.1% S. Only a trace of chlorine was detected in the analysis.

Example 3

To 20.0 grams of $(C_2H_5O)_2P(S)SCH_2SC_2H_4OH$ in 150 ml. of benzene was added 14.0 grams of $(C_2H_5O)_2P(S)Cl$. Triethylamine, 8.0 grams, was then added dropwise and some slight reaction was observed to take place. The reaction mixture was warmed to 60° C. for 1 hour after which a precipitate was observed to form. Reaction was continued with stirring overnight at room temperatures. Then 250 cc. of water was added and the benzene solution was separated and dried over sodium sulfate. Upon concentration of the organic phase to 60° C. at 1.5 mm. Hg, 27.5 grams (88.5% of theoretical yield) of O,O-diethyl-S - [2 - (O,O-diethylphosphorothiono) ethylthiomethyl] phosphorodithioate having an index of refraction $N_D^{25} = 1.5205$ was recovered. By analysis this compound was found to contain 14.3% P and 28.2% S compared to 14.4% P and 29.8% S, theoretical.

Example 4

To 16.5 grams of $(C_2H_5O)_2P(S)SCH_2SC_2H_4OH$ and 6.7 grams of triethylamine in 100 ml. of ether was added 9.2 grams of $C_4H_9SC(O)Cl$ in 20 cc. of ether at a temperature of 25° C. Triethylamine hydrochloride was observed to precipitate out of solution. The mixture was allowed to reflux for 30 minutes and thereafter was stirred overnight at room temperature. Fifty cc. of water was added to the reaction mixture and the ether phase was separated, washed twice with 50 cc. of water, and finally the water phase was counter extracted with 50 cc. of ether. The ether phases were combined, dried over sodium sulfate, and concentrated to 60° C. at 1 mm. of Hg. to yield 21.4 grams (91% of theoretical yield) of O,O-diethyl - S - [2-S-butylthiocarbonato)ethylthiomethyl] phosphorodithioate having an index of refraction $$N_D^{25} = 1.5295$$

By analysis the product was found to contain 8.1% P and 33.8% S compared to 7.9% P and 32.6% S theoretical.

Using a procedure substantially in accordance with one of those described in the foregoing examples, the following specific compounds were prepared:

Example 5

O,O-diethyl-S-[2-(S-methylthiocarbonato) ethylthiomethyl] phosphorothioate

*Analysis.*—Found: 7.0% P; 29.8% S. Calcd.: 9.3% P; 28.7% S.

Yield=74% of theory.

Example 6

O,O-diethyl-S-[2-(S-ethylthiocarbonato) ethylthiomethyl] phosphorothioate

*Analysis.*—Found: 6.4% P; 25.2% S. Calcd.: 8.9% P; 27.1% S.

Yield=67% of theory.

Example 7

O,O-diethyl-S-[2-(S-ethylthiocarbonato) ethylthiomethyl] phosphorodithioate

*Analysis.*—Found: 8.9% P; 37.2% S. Calcd.: 8.5% P; 35.1% S.

Yield=80.3% of theory.

Example 8

O,O-diethyl-S-[2-(S-methylthiocarbonato) ethylthiomethyl] phosphorodithioate

*Analysis.*—Found: 8.9% P; 38.2% S. Calcd.: 8.8% P; 36.5% S.

Yield=72% of theory.

Example 9

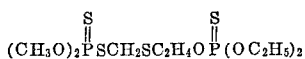

O,O-dimethyl-S-[2-(O,O-diethylphosphorothiono) ethylthiomethyl] phosphorodithioate

*Analysis.*—Found: 15.3% P; 29.3% S. Calcd.: 15.5% P; 32.0% S.

Yield=66% of theory.

Example 10

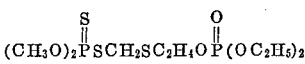

O,O-dimethyl - S - [2-(O,O-diethylphosphoro) ethylthiomethyl] phosphorodithioate

*Analysis.*—Found: 14.9% P; 28.3% S. Calcd.: 16.1% P; 25.0% S.

Yield=59% of theory.

Example 11

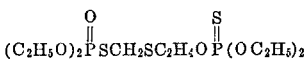

O,O-diethyl - S - [2-(O,O-diethylthionophosphoro) ethylthiomethyl] phosphorothioate Yield=100% of theory.

The foregoing compounds have been tested as pesticides by the following methods: Adult house flies (*Musca domestica*, Linn.) and nymphs of the American cockroach (*Periplaneta Americana*, Linn.) and spotted milkweed bug (*Oncopeltus fasciatus*, Dallas) were caged in cardboard mailing tubes with cellophane bottoms and coarse mesh nylon tops and supplied with food and water. From 10 to 25 insects were employed per cage, depending upon the species. The candidate compounds were dissolved in 10 mm. of a suitable solvent, usually acetone. Aliquots of the toxic solutions were suspended in water containing 0.0175% by vol. Sponto 221, an emulsifying agent, and sprayed on the caged insects. The compounds were sprayed with a DeVilbiss hand sprayer at 20 p.s.i. in a fumehood. Final mortality readings were taken after 72 hours.

The two-spotted mite (*Tetranychus telarius*, Linn.), was screened by using young pinto bean plants in the primary leaf stage as the host plants. The plants were dipped in a water suspension of the candidate compound and the soil was drenched at a concentration of 100 p.p.m., based on the weight of the soil. Mites were confined to the leaves with small clip cages. The miticidal, ovicidal, and phytotoxic actions of the test compounds were determined after 7 and 14 days. The 14 day reading was necessary for evaluating ovicidal activity.

Aphids were tested using the broad bean as the host plant. Systemic and contact activity were screened for simultaneously. The plant was dipped in an aqueous suspension of the canididate compound and the soil was drenched at a concentration of 100 p.p.m., based on the weight of the soil. The aphids were confined to the leaves with small clip cages.

Pesticidal activity for the compounds of the invention is illustrated in the following table wherein the percentage kill among the group of pest species is reported for a specific percentage concentration of toxicant in aqueous solution. A slanted line is used to separate the percentage kill, shown on the left, and the percentage concentration, shown on the right.

TABLE.—PESTICIDAL ACTIVITY

| Compound (Example No.) | M. domestica percent kill/ percent conc. | P. Americana percent kill/ percent conc. | O. fasciatus percent kill/ percent conc. | T. telarius (Post Embryo) percent kill/percent conc. | T. telarius (Eggs) percent kill/ percent conc. | M. pisi percent kill/percent conc. |
|---|---|---|---|---|---|---|
| 1 | 100/0.1 | 20/0.05 | 60/0.05 | 100/0.005 | 100/0.01 | 100/0.01 |
| 2 | 100/0.1 | 30/0.05 | 20/0.1 | 100/0.01 | 100/0.01 | |
| 3 | 100/0.1 | 100/0.1 | 90/0.1 | | | 100/0.01 |
| 4 | 100/0.1 | 40/0.1 | | 100/0.05 | 100/0.1 | |
| 5 | 100/.01 | | | 100/0.01 | 100/0.5 | |
| 6 | 100/.01 | | | 100/0.05 | 50/0.05 | |
| 7 | 100/0.1 | 80/0.1 | | 100/0.05 | 100/0.05 | 100/0.01 |
| 8 | 100/0.1 | 80/0.1 | 20/0.1 | 100/0.005 | 80/0.005 | |
| 9 | 100/0.1 | 70/0.05 | 100/0.05 | 30/0.01 | 0/0.01 | |
| 10 | 100/0.1 | 0/0.1 | 0/0.1 | 100/0.05 | 0/0.05 | |
| 11 | 100/0.1 | 40/0.1 | 90/0.1 | 90/0.05 | 0/0.05 | 100/0.01 |

Where used herein the term "pesticide" is intended in the restricted sense generally recognized in the art as applying to the lower forms of life customarily controlled by chemical means and excluding the higher animals, the vertebrates, for example rodents, birds, and larger forms which are more commonly controlled by mechanical means, such as traps. It will, however, be apparent to one skilled in the art that the toxic activity of the new compounds with various pest species is indicative of activity with species and orders not specifically shown. Although the above pesticidal tests were accomplished with aqueous dispersions, the toxic compounds may also be used in the form of solutions (aqueous) when appreciably water soluble, non-aqueous solutions, wettable powders, vapors, and dusts, as may be best suited to the conditions of use.

Various other changes and modifications will suggest themselves to those skilled in the art, without departing from the scope of our invention, and it is to be understood therefore, that only such limitations shall be placed thereupon as are specifically set forth in the following appended claims.

What is claimed is:

1. A method for controlling insect and mite pests which comprises contacting said pests with a pesticidal amount of a compound of the formula:

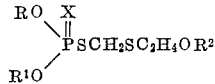

wherein R and R¹ are lower alkyl, X is oxygen or sulfur and R² is selected from the group consisting of

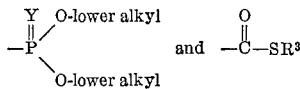

wherein Y is oxygen or sulfur and R³ is selected from the group consisting of lower alkyl and phenyl.

2. The method of claim 1, wherein the compound utilized has the formula:

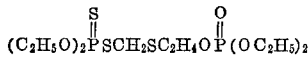

3. The method of claim 1 wherein the compound utilized has the formula:

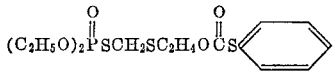

4. The method of claim 1, wherein the compound utilized has the formula:

(C₂H₅O)₂P̈SCH₂SC₂H₄OP̈(OC₂H₅)₂

5. The method of claim 1, wherein the compound utilized has the formula:

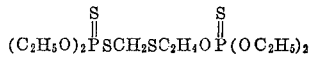

6. The method of claim 1, wherein the compound utilized has the formula:

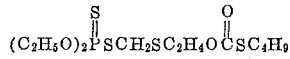

7. The method of claim 1, wherein the compound utilized has the formula:

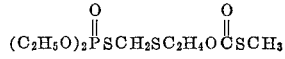

8. The method of claim 1, wherein the compound utilized has the formula:

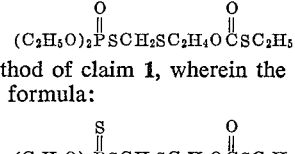

9. The method of claim 1, wherein X is oxygen.
10. The method of claim 1, wherein X is sulfur.

References Cited
UNITED STATES PATENTS

| | | | |
|---|---|---|---|
| 2,586,655 | 2/1952 | Hook et al. | 260—461 |
| 2,736,738 | 2/1956 | Morris | 260—461 |
| 2,920,993 | 1/1960 | Fairchild | 167—22 |
| 2,929,834 | 3/1960 | Schrader | 260—929 |
| 2,954,317 | 9/1960 | Kenaga | 167—22 |

ALBERT T. MEYERS, *Primary Examiner.*

S. FRIEDMAN, *Assistant Examiner.*

UNITED STATES PATENT OFFICE
CERTIFICATE OF CORRECTION

Patent No. 3,397,269                        August 13, 1968

Edward N. Walsh

It is certified that error appears in the above identified patent and that said Letters Patent are hereby corrected as shown below:

Column 6, lines 16 to 18, the left-hand portion of the formula should appear as shown below:

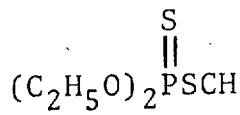

Signed and sealed this 3rd day of February 1970.

(SEAL)
Attest:

Edward M. Fletcher, Jr.                    WILLIAM E. SCHUYLER, JR.

Attesting Officer                                Commissioner of Patents